United States Patent [19]

Yean et al.

[11] Patent Number: 5,310,847
[45] Date of Patent: May 10, 1994

[54] POLYMER COMPOSITIONS BASED ON POLYTHIOURETHANES FOR THE MANUFACTURE OF ORGANIC GLASSES

[75] Inventors: Leanirith Yean, Longjumeau; Christophe Bochu, Maisons-Alfort, both of France

[73] Assignee: Essilor International (Compagnie Generale d'Optique), Creteil, France

[21] Appl. No.: 896,795

[22] Filed: Jun. 9, 1992

Related U.S. Application Data

[63] Continuation of Ser. No. 552,177, Jul. 13, 1990, abandoned.

[30] Foreign Application Priority Data

Jul. 13, 1989 [FR] France .................. 89 09492

[51] Int. Cl.$^5$ ............................................. C08G 18/00
[52] U.S. Cl. ............................... 528/44; 528/45; 528/59; 528/61; 528/67; 528/76; 428/423.1; 160/25
[58] Field of Search ............ 528/44, 45, 59, 61, 528/67, 76; 428/423.1; 560/25

[56] References Cited

U.S. PATENT DOCUMENTS

| | | | |
|---|---|---|---|
| 3,984,456 | 10/1976 | Guthrie et al. | 560/25 |
| 4,689,387 | 8/1987 | Kajimoto et al. | 528/76 |
| 4,775,733 | 10/1988 | Kanemura et al. | 528/67 |
| 4,788,083 | 11/1988 | Dammann et al. | 427/340 |
| 4,946,923 | 8/1990 | Nagata et al. | 528/76 |

FOREIGN PATENT DOCUMENTS

| | | |
|---|---|---|
| 22808/88 | 4/1989 | Australia . |
| 29950/89 | 8/1989 | Australia . |
| 37136/89 | 4/1990 | Australia . |

*Primary Examiner*—John Kight, III
*Assistant Examiner*—Duc Truong
*Attorney, Agent, or Firm*—Millen, White, Zelano & Branigan

[57] ABSTRACT

The present patent application relates to a polyurethane composition for organic glasses characterized in that it comprises: a first constituent formed by a polyisocyanate at least di-functional, and a second constituent formed by an acyclic saturated monomer bearing at least three reactive functions with respect to isocyanates to form carbamate links, among which reactive functions at least 40% in number are —SH mercapto groups, the proportion of the reactive functions being at least 45% by weight with respect to the molecular weight of the monomer.

23 Claims, No Drawings

POLYMER COMPOSITIONS BASED ON POLYTHIOURETHANES FOR THE MANUFACTURE OF ORGANIC GLASSES

This application is a continuation of application Ser. No. 07/552,177, filed Jul. 13, 1990, now abandoned.

BACKGROUND OF THE INVENTION

The invention relates to the manufacture of organic glasses based on polyurethane compositions of the type that are used to constitute optical lenses, more particularly, ophthalmic lenses, it being understood that urethanes have a formula resulting from the condensation of isocyanate groups with alcohol groups.

The invention aims essentially at developing a polyurethane composition able to polymerize into organic glasses, or transparent plastics materials, exhibiting a high refractive index, with low dispersion, as well as high mechanical strength, or more particularly high thermomechanical properties.

Considerable research has already been carried out with a view toward increasing the refractive index of transparent organic materials, in order to take better advantage of their light weight compared to inorganic glasses in the optical field. The research has led in particular to using sulfur-containing polyurethane resins.

Sulfur-containing polyurethane compositions can be obtained as described in U.S. Pat. No. 4,680,369 by reacting a polyisocyanate, such as xylylene diisocyanate or hexamethylene diisocyanate, with a polyol monomer including intermediate thio-ether chains, but this does not lead to a satisfactory refractive index. Others can be obtained by reacting a similar polyisocyanate with polythiol monomers as described in U.S. Pat. No. 4,689,387 and in European Patent Application 0 235 743. In that prior art however, monomers with complicated formulae which are difficult to use are derived from general types of monomers as currently used in the field or organic glass manufacture based on polyurethanes; and, when aliphatic compounds with mercapto groups —SH are used, they always include either thio-ether or ester groups in the monomer chain, as are obtained through polycondensation of glycols.

The polymers produced using these known techniques exhibit poor thermomechanical resistance, and in particular, their glass transition temperature is too low with respect to temperatures necessary for the surface treatment of optical lenses. Besides, technical and economic difficulties are encountered because these monomers correspond to compounds which are not easily available and which demand delicate synthesis procedures of, which renders them particularly expensive. In addition, they often cause other difficulties for the manufacture of polyurethanes, particularly when they form viscous solutions or when the reaction of the thiol functions on the isocyanate functions is disturbed by their structure.

SUMMARY OF THE INVENTION

To solve these problems, the invention provides monomers of a novel type for this kind of use, but which are chemical compounds known per se and generally commercially available at an inexpensive price for fields or use different from the manufacture of polymers. Using them here as monomers which should be condensed with polyisocyanates in the manufacture of polyurethanes, and more specifically for the manufacture of organic glasses, was hence in no way obvious to those skilled in this art.

Other objects of the invention are to obtain organic glasses having a high refractive index, high constringency, and a high glass transition temperature, which are stable a long time and are not sensitive to light or weathering, which are colorable and easily removable from a mold, and which exhibit high impact strength, high abrasion and scratch resistance, and good thermomechanical properties even when heated above the glass transition temperature.

According to the invention, a polyurethane composition for organic glasses comprises:

a polyurethane composition for organic glasses comprising a first component made of an at least difunctional polyisocyanate and a second component made of an acyclic saturated monomer having at least three reactive groups with respect to isocyanates per molecule, in respective amounts, to polymerize through formation of carbamate links, wherein said reactive groups are —SH mercapto groups for at least 40% in number and are present in a proportion at least amounting to 45% by weight with respect to the molecular weight of said monomer.

It is apparent from these conditions that the monomer in the composition of the invention can comprise two carbon atoms per molecule only if at least one carbon atom is a bearer of at least two —SH or —OH groups. However, more generally, it is advantageous to use a monomer which is at least tri-functional, constituted by an acyclic aliphatic compound which includes at least three carbon atoms per molecule, at least half of which are provided with a reactive —SH or —OH function, at least half of these reactive functions being —SH mercapto groups.

In practice, it seems that the best results are obtained when the molecule of the monomer comprises between three and ten carbon atoms, preferably between three and six carbon atoms, and that among its reactive functions at least 50% in number are —SH mercapto groups, the proportion of said reactive functions being at least 55% by weight with respect to the molecular weight of said monomer. Among the monomers giving the best results, there are preferably used within the scope of the invention, monomers for which the proportion of said reactive functions is at least 70% by weight with respect to the molecular weight of said monomer.

Performing the invention in practice leads to use preferably of monomers constituted by compounds of the straight- or branched-chain alkane type, wherein the alkane chain is not interrupted by an ether or thioether function, i.e., it does not comprise any intramolecular S or O heteroatoms.

In addition, when the compounds used as monomers according to the invention are linear aliphatic alkane chains, it is desirable that at least ⅔, and preferably all, of the carbon atoms that they comprise be bearers of reactive functions, which preferably are all —SH groups. The same condition can advantageously apply to each of the majority of the branches of a branched-chain alkane.

The invention extends to the use of the compositions described for the manufacture of glasses made of the transparent polymer and to the use of these glasses as optical lenses. The employment of these compositions is carried out in a conventional manner, by polymerization techniques usual for polyurethanes, preferably simultaneously with forming by molding. Heat polymerization is generally preferred and is applied to a composition exclusively comprising the two basic components, as defined above, plus a suitable polymerization catalyst. The polymerization catalyst is generally a metallic ester, typically tin dibutyl-laurate. The two basic components are present in the composition in respective proportions selected in accordance with the stoichiometry of the reactions leading to carbamate linkages. It must, however, be understood that each of the constituents can comprise several different compounds corresponding to the definition which it has been given.

It is remarkable that due to the invention, it has appeared possible to combine in the same composition all the desired qualities and that in the resulting polymer it has been possible to obtain improvements both in the refractive index and in the glass transition temperature to values which it was not known how to reach, even separately, by any of the prior art compositions, whether they use particularly as monomers aliphatic compounds, aromatic compounds or compounds comprising triazine rings. Thus the preferred compositions according to the invention lead to transparent polymers of the poly(thio)urethane type which have a refractive index higher than 1.6 (preferably higher than 1.64 and a constringence coefficient (inverse on dispersion) at least of the order of 30, for a glass transition temperature higher than 100° C.

Within this framework, a constituent with particularly advantageous isocyanate reactive functions is xylylene diisocyanate, customarily available on the market in the form of a mixture of meta and para isomers. However, other homologous constituents can be chosen among the aryl-alkyl diisocyanates corresponding to the general formula:

$$OCN-R-(C_6H_4)-R'-NCO$$

in which R and R', identical or different, are each an alkyl radical comprising from 1 to 3 carbon atoms and are placed with respect to one another in the ortho, meta or para positions of the aromatic ring. In the case of xylylene diisocyanate, R and R' have both the value $-CH_2-$.

Generally, it is preferred that the polyisocyanate does not contain any sulfur and that the composition does not contain any sulfur-containing isocyanate.

Furthermore, xylylene-diisocyanate is preferably not used when the mercapto monomer is pentaerythrithiol.

The invention will now be described in more detail with reference to particular examples of its practice which examples are in no way limiting.

EXAMPLE 1

In this example, there is used as a monomer having mercapto groups 2,3-dimercapto propanol of the formula $HSCH_2-CH_2SH-CH_2OH$. The proportion of functions which are reactive with regard to isocyanates is 66.9% by weight with respect to the molecular weight, and the ratio SH/SH+OH is 66.7% in number.

In a flask, 6 g of 2,3-dimercapto propanol and 20.5 g of xylylene diisocyanate (XDI) are mixed, which represents a ratio (OH+SH)/NCO=1. 0.02% by weight of tin dibutyllaurate are added as polymerization catalyst.

After having been de-gassed, this mixture is placed in an optical lens mold. This mold being of glass, its walls have been treated to avoid adhesion of the polymer to the glass. The polymerization is performed according to a temperature cycle comprising three hours to pass from ambiant temperature to 80° C., then three hours of maintenance at 80° C., followed by a rise in temperature from 80° C. to 130° C. in two hours and finally three hours of maintenance at 130° C.

After unmolding, a perfectly transparent lens is obtained, whose refractive index is 1.622 and the constringence (inverse of the dispersion coefficient) is 37. The density of the polymer obtained is 1.28 and its glass transition temperature 130° C.

EXAMPLE 2

By proceeding in the same manner as in Example 1, but by replacing the 2,3-dimercapto propanol by another momomer of which the molecule is a linear alkane chain with three or four carbon atoms all bearing a hydroxylated reactive group or mercaptan.

In this way polymers having the following properties were obtained:
a) Compound: Dithioerythritol
   Reactive functions: 64.9% by weight
   Ratio SH/SH+OH: 50.0% in number
   Refractive index: 1.615
   Constringence: 33
   Density: 1.3
   Glass transition: 161° C.
b) Compound: Trithioglycerin
   Reactive functions: 70.7% by weight
   Ratio SH/SH+OH: 100% in number
   Refractive index: 1.654
   Constringence: 31
   Density: 1.38
   Glass transition: 149° C.
c) Compound: Tetramercaptobutane
   Reactive functions: 71% by weight
   Ratio SH/SH+OH: 100% in number
   Refractive Index: 1.667
   Constringence: 32
   Density: 1.45
   Glass transition: 183° C.

EXAMPLE 3

Procedure is as in the preceding Examples using as monomer a branched alkane chain at least trivalent in thiol functions, and more particularly pentaerythrithiol. The following results are obtained:
Isocyanate: Diethyl-benzene diisocyanate
Polythiol: 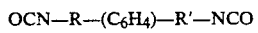
   Reactive functions: 66% by weight
   Ratio SH/SH+OH: 100% in number
   Refractive index: 1.646
   Constringence: 29
   Density: 1.36
   Glass transition: 110° C.

Naturally, the invention is in no way limited by the particularities which have been specified in the preceeding Examples or by the details of the particular embodiments selected to illustrate the invention. All sorts of modifications may be introduced in the operational conditions as well as in the nature and the proportions of the constituents and reactants without departing however from the scope of the invention.

What we claim is:

1. A polyurethane composition suitable for the production of optical lenses having a refractive index higher than 1.6 and a glass transition temperature higher than 100° C., said polyurethane obtained by reacting a first component made of an at least difunctional polyisocyanate free of intramolecular sulfur atoms and a second component made of an acyclic saturated monomer having at least three reactive groups with respect to isocyanates per molecule, in respective amounts, to polymerize through formation of thiocarbamate and, optionally, carbamate links, wherein said reactive groups are —SH mercapto groups for at least 40% in number and are present in a proportion at least amounting to 45% by weight with respect to the molecular weight of said monomer.

2. A polyurethane composition according to claim 1, wherein said first component is a difunctional arylalkyl isocyanate and the composition does not comprise any sulphur-containing isocyanate.

3. A composition according to claim 2, wherein said first constituent is xylylene-di-isocyanate.

4. A composition according to claim 2 wherein said monomer is an acyclic aliphatic compound at least trifunctional which comprises at least three carbon atoms per molecule, half at least of which are provided with a reactive —SH or —OH function, half at least of these reactive functions being —SH mercapto groups.

5. A composition according to claim 4 wherein said monomer comprises between three and six carbon atoms, and in that among its reactive functions at least 50% in number are —SH mercapto groups, the proportion of said reactive functions being at lest 55% by weight with respect to the molecular weight of said monomer.

6. A composition according to claim 1 wherein said monomer is is a linear or branched aliphatic alkane chain, in which at least ¾ of the carbon atoms are bearers of said reactive groups.

7. A composition according to claim 6, wherein said monomer is selected from among the following compounds: 2,3-dimercapto propanol, dithioerythritol, trithioglycerin, or tetramercaptobutane.

8. A composition according to claim 6, wherein said monomer is pentaerythrithiol, provided that the polyisocyanate is not xylylene-diisocyanate.

9. A composition according to claim 5, wherein the proportion of said reactive functions is at least 70% by weight with respect to the molecular weight of said monomer.

10. A composition according to claim 6, wherein all of the carbon atoms are bearers of said reactive groups.

11. A composition according to claim 6, wherein all of the reactive groups are mercapto groups.

12. A composition according to claim 10, wherein all of the reactive groups are mercapto groups.

13. A composition according to claim 6, wherein said monomer is dithioerythrithiol, trithioglycerin, or tetramercaptobutane.

14. A composition according to claim 8, wherein the isocyanate is diethylbenzene diisocyanate.

15. A composition according to claim 3, wherein said monomer is dithioerythritol, trithioglycerin, or tetramercaptobutane.

16. An optical lens having a refractive index higher than 1.6, a constringence coefficient at least on the order of 30, and a glass transition temperature higher than 100° C., said optical lens comprising a polyurethane composition according to claim 1.

17. An optical lens according to claim 16, wherein the refractive index is higher than 1.64.

18. An optical lens having a refractive index higher than 1.6, a constringence coefficient at least on the order of 30, and a glass transition temperature higher than 100° C., said optical lens comprising a polyurethane composition according to claim 7.

19. An optical lens having a refractive index higher than 1.6, a constringence coefficient at least on the order of 30, and a glass transition temperature higher than 100° C., said optical lens comprising a polyurethane composition according to claim 9.

20. A composition according to claim 6, wherein said monomer is trithioglycerine or tetramercaptobutane.

21. A process for the production of a polymeric lens, said process comprising:
mixing 2,3-dimercaptopropanol and xylylene diisocyanate in a ratio such that the sum of mercapto and hydroxy groups is substantially equal to the sum of isocyanate groups;
adding a catalytic amount of a polymerization catalyst;
degassing the resultant mixture and placing the degassed mixture in an optical lens mold;
conducting polymerization in said mold according to a temperature cycle comprising about three hours to pass from ambient temperature to about 80° C., then about three hours of polymerization maintained at about 80° C., followed by an increase in temperature from about 80° to about 130° C. for a period of about two hours, and maintaining the polymerization temperature for three hours at about 130° C.; and
removing resultant lens from the mold in order to obtain a perfectly transparent lens having a refractive index of about 1.622, a constringence of about 37, a density of about 1.28 and a glass transition temperature of about 130° C.

22. A composition according to claim 1, wherein the polyisocyanate is free of intramolecular oxygen atoms.

23. An optical lens having a refractive index higher than 1.6, a constringence coefficient at least on the order of 30, and a glass transition temperature higher than 100° C., said optical lens comprising a polyurethane composition according to claim 20.

* * * * *